United States Patent Office 3,660,534
Patented May 2, 1972

---

3,660,534
PROCESS FOR CONTROLLING MELT FLOW OF RUBBER-MODIFIED POLYMERS
Frederick E. Carrock, Paramus, and Kenneth W. Doak, Wyckoff, N.J., and Alfred J. Ackerman, Mentor, Ohio, assignors to Dart Industries Inc., Los Angeles, Calif.
No Drawing. Continuation-in-part of application Ser. No. 632,194, Apr. 20, 1967. This application July 9, 1970, Ser. No. 53,699
Int. Cl. C08f 15/04
U.S. Cl. 260—880 R     3 Claims

ABSTRACT OF THE DISCLOSURE

The melt flow of rubber-modified polystyrene, ABS and the like is controlled by contacting polymerizable vinyl monomers with a chelating agent such as ethylenediaminetetraacetic acid and a mercaptan chain regulator such as tertiary dodecyl mercaptan in the presence of water and polymerizing the resulting mixture.

CROSS-REFERENCE TO RELATED APPLICATIONS

This application is a continuation-in-part of application Ser. No. 632,194, filed Apr. 20, 1967, now abandoned.

BACKGROUND OF THE INVENTION

(1) Field of the invention

This invention relates to an improved process for converting vinyl monomers and rubbery materials to rubber-modified polymers which process uses mercaptan chain regulators during the bulk, solution and/or suspension polymerization step. More particularly, it relates to a method of controlling the melt flow properties of polymers recovered from such a process.

(2) Description of the prior art

Numerous processes have been developed for preparing rubber-modified polymers from monovinyl compounds, such as styrene and acrylonitrile and the like with a rubbery material. These processes include bulk (or mass), solution and suspension polymerization and combinations of these techniques.

Mercaptans are used in such processes to control the polymer chain length which in turn influences the melt flow of the resulting product. The melt flow of a given polymer is important in determining its relative processability. In general, the low melt flow polymers are extruded and the high melt flow polymers are injection molded into the various articles of commerce. Surprisingly it has been found that in such processes the proper degree of chain length is not achieved because of competing side reactions not fully understood at this time. These competing side reactions tend to consume large quantites of mercaptans making them unavailable for chain length modification. This results in polymers having uncontrolled and erratic melt flow properties. This tendency was especially noted in the preparation of ABS polymers by a bulk-suspension process. Melt indices for the acrylonitrile-butadiene-styrene (ABS) polymers from this particular process were erratic and too low for molding applications even with the addition of large amounts of mercaptans. However, as described herein, the process of this invention permits one to effectively control the melt flow of the resulting polymers.

SUMMARY OF THE INVENTION

It is an object of the present invention to provide an improvement in bulk, solution and/or suspension polymerization processes which employ mercaptans for producing rubber-modified polymers.

Another object of this invention is to provide a method for regulating and controlling polymerization reactions which employ mercaptans for polymer chain length regulation and for controlling the melt flow properties of the resulting rubber-modified polymers.

These objects are accomplished by adding to the polymerization process a chelating agent which substantially eliminates competing side reactions possibly by chelating metallic impurities in the system. This in turn frees the mercaptans for polymer chain length control. Although chelating agents have been used in emulsion polymerization processes with iron and peroxides to control the rate of initiation (see U.S. Pat. 3,061,596), such agents have not been used in bulk, solution or suspension polymerization processes and have not been used to aid in the control of melt flow properties of the resulting polymers.

The present invention provides in a process for interpolymerizing a monomer from the group consisting of monovinyl aromatic, monomeric vinyl, monomeric vinylidene compounds or mixtures thereof with a rubbery material in a reaction zone and recovering a rubber-modified polymer therefrom, the improvement for controlling the melt flow of the polymer which comprises contacting in the reaction zone reactants selected from the list given below with a chelating agent containing at least one free acid group per molecule and a mercaptan chain regulator in the presence of water and polymerizing the resulting mixture in the reaction zone. The reactants include (a) at least one polymerizable vinyl or vinylidene monomer and a rubbery material, (b) at least one polymerizable monomer, a rubbery material and a diluent, (c) at least one polymerizable monomer and a rubbery material suspended in an aqueous system containing a suspension stabilizer, (d) a prepolymer mixture comprising at least one polymerizable monomer, a rubbery material, and up to about 50 weight percent of the rubber-modified polymer, (e) a prepolymer mixture comprising at least one polymerizable monomer, a rubbery material, up to about 50 weight percent of the polymer, and a diluent and (f) a prepolymer mixture comprising at least one polymerizable monomer, a rubbery material and up to 50 weight percent of the polymer suspended in an aqueous system containing a suspension stabilizer.

THE PREFERRED EMBODIMENTS OF THIS INVENTION

The chelating agent must contain at least one free acid group and preferably at least one carboxylic acid group per molecule. Examples of suitable chelating agents include ethylenediamine tetraacetic acid, methylene disalicylic acid, salicylic acid, citric acid, tartaric acid, ascorbic acid, phosphoric acid and the partial salts of these acids. The chelating agent must be present in the reaction zone in amounts of at least 0.001% based on the weight of the total reaction mixture. The desired improvement in the polymerization processes can be obtained with amounts up to about 5 weight percent and more. However, no further improvement is noted at these high levels which are impractical from an economic standpoint. The optimum range of the chelating agent in the reaction zone is from at least 0.025 to 0.2% based on the weight of the reaction mixture.

It is highly desired and in some cases required that at least some water be added to the reaction zone with the chelating agent to obtain the desired degree of melt flow control in the polymerization process. However, water need not be added where a sufficient amount of water is inherently present in the reaction zone because of residual amounts of water in the reactants and/or the moisture in the reaction zone atmosphere. Preferably, water is added directly to the reaction zone to assure that sufficient amounts are present to obtain the desired control. Of course, in the case of reactants (c) and (f) in the foregoing Summary, no additional water need be added because the monomer is suspended in an aqueous system.

The mercaptan chain regulator that must be included in the reaction zone with the chelating agent includes various aliphatic and aromatic mercaptans. Examples of such mercaptans include nonyl, decyl and dodecyl mercaptan and other alkyl mercaptans having from 6 to 24 carbon atoms per molecule or mixtures of these. They are used in amounts of from about 0.01 up to a maximum of 2.0% by weight based on the total weight of the reaction mixture. The preferred concentration of mercaptans is from about 0.02 to 0.4 weight percent depending on the melt flow properties desired. The mercaptans can be added to the reaction zone all at once or in increments during the polymerization reaction.

The polymerizable vinyl monomers used in the process of this invention include monovinyl aromatic compounds having the vinyl group attached directly to the carbon atom of the aromatic nucleus. Styrene is one of the preferred monovinyl aromatic compounds used in this process. Examples of other compounds which can be used are the alkyl and/or halogen derivatives of styrene including the methylstyrenes, ethylstyrenes, isopropylstyrenes, butylstyrenes, including both the mono- and higher substituted alkyl forms, the chloro- and dichlorostyrenes, as well as the mono- and dibromostyrenes and alkyl halostyrenes, or mixtures of these compounds with styrene or with each other. The monomeric vinyl and vinylidene compounds which can be used include acrylonitrile, methacrylonitrile, methylacrylate, methyl methacrylate, methacrylic acid, acrylic acid, vinyl chloride and mixtures thereof. It is desirable to combine monomeric vinyl or vinylidene compound with one or more of the monovinyl aromatic compounds to obtain a product with enhanced properties.

The rubbery materials used in this process include natural rubber, or synthetic rubbers, such as SBR-type rubbers, which are copolymers of styrene and butadiene having 60 to 95% by weight of butadiene and from 40 to 5% of styrene; solution-polymerized linear random or block copolymer type SBR's wherein stereospecific catalysts are used and wherein the amount of butadiene can vary from 60 to 95% by weight of the monomeric mixture and in the more preferred embodiment, from about 70 to 95 weight percent; synthetic nitrile type rubbers containing from 55 to 82% by weight of butadiene and from 45 to 18% acrylonitrile; rubbery homopolymers of butadiene and of isoprene; the rubbery copolymers of isobutylene combined with butadiene or isoprene; and rubbery terpolymers of ethylene, propylene, and a minor amount of a diene monomer such as cyclopentadiene. The preferred rubbery material is a linear polybutadiene having a cis (polymerized by 1,4 addition) content of about 30 to 98 weight percent, preferably 35 to 60 weight percent. Preferably a minor amount of the rubbery material is dissolved in the polymerizable monomer in the reaction zone and polymerized in bulk to form the rubber-modified polymer.

Butadiene (or isoprene) polymerized by cis-1,4 addition exists in a rubbery form at ambient temperatures. The cis-1,4 form can be produced either by lithium metal or lithium alkyls or by a Ziegler type catalyst system, as is well known in the art. These methods of polymerization yield linear polymers in contradistinction to a largely non-linear polymer obtained by well known emulsion polymerization recipes. The preferred cis-polybutadiene which can be employed in the compositions of this invention will have a viscosity between 20 to 60 as measured on the Mooney viscometer at 100° C. (ML$_4$) (ASTM–D–927–55T).

The rubbery materials used in this process usually have a molecular weight of about 15,000 and higher. They can be incorporated into the reaction mixture in amounts from about 2 to 30% by weight based on the total weight of the reaction mixture, and more preferably the rubbery components are used in amounts of about 4 to 15 weight percent. In the preparation of ABS polymers, about 3 to 10% of the rubbery component results in a medium to high impact ABS polymer, and about 10 to 15% rubber yields very high impact resins.

It has been found to be advantageous to incorporate a small amount, up to about 5 weight percent, and preferably from about 0.5 to 3.0 weight percent of a lubricant. Small amounts of such lubricants as polybutenes, hydrogenated polybutenes, paraffin wax or mineral oil, improve the processing and tensile elongation characteristics of the polymers. Other lubricants which can be used include esters or metal salts of saturated higher fatty acids.

Suitable antioxidants can also be included with the reactants in amounts from about 0.2 to 2% by weight of the total reaction mixture and more preferably in amounts from about 0.3 to 1 weight percent. Examples of such antioxidants include trisnonylphenyl phosphite and phenolic type materials such as 2,6-di-t-butyl-4-methylphenol.

The specific process conditions for carrying out the process of this invention are included below with the descriptions of the bulk, solution or suspension polymerization reactions. In the bulk polymerization process, the only reactants essential are the polymerizable monomer or mixtures of monomers.

The bulk polymerization step can be carried out with or without initiators. The initiator(s) is present in small amounts, i.e., about 0.02 to 0.5, up to the maximum of 1.0% based on the total weight of the reaction mixture. The initiator is of a free-radical generating type compound such as an organic peroxide compound. Suitable peroxide initiators include dibenzoyl peroxide, dilauroyl peroxide, di-t-butyl peroxide, cyclohexanone peroxide, t-butyl perbenzoate, t-butyl hydroperoxide, diacetyl peroxide, diethyl peroxydicarbonate, cumene hydroperoxide and dicumyl peroxide.

In one of the preferred embodiments of this invention, an ABS polymer is prepared by a bulk prepolymerization step followed by a suspension polymerization step. In the bulk step, styrene is added to the reaction zone and acrylonitrile is then added in a ratio of about 20 to 40 parts by weight of the acrylonitrile, to 80 to 60 parts by weight of styrene. A finely ground monomer-soluble rubbery material in an amount from about 4 to 15 weight percent is then dissolved in the monomeric mixture in the reaction zone which contains means for agitation. Antioxidants, lubricants and inert fillers can then be added to the mixture in the reaction zone. In this particular embodiment, at least 0.025% by weight of the chelating agent of this invention is added to the mixture based on the total weight of the reaction mixture. A preferred chelating agent is ethylenediaminetetraacetic acid (EDTA) or one of its partial salts, i.e., the trisodium salt of ethylenediaminetetraacetic acid (EDTA-Na$_3$). The mercaptan chain regulator is then added to the reaction mixture. Greater than 0.15% by weight water based on the total weight of the reaction mixture must be present during the reaction. Preferably, at least 0.3 up to about 5 weight percent water should be present to assure proper control of the melt index.

After the addition of the mercaptan chain regulator, the polymerization in bulk is commenced either thermally or using a peroxide initiator of the oil soluble type. In the case of thermal initiation, the temperature range can be from 90° to 120° C., preferably 100° to 110° C.; and in the case of the peroxide initiation, the temperature can range from about 60° to 120° C., preferably from about 75° to 90° C. The polymerization is continued until from about 15 to 50% of the monomers are polymerized in the mixture. The prepolymerization step generally takes from about 3 to 6 hours. If included in the reaction the peroxide catalyst is preferably used in amounts from about 0.01 to 0.15% by weight based on the total mixture in the reaction zone.

During the bulk prepolymerization step, the components of the system are thoroughly agitated. Agitation is required to properly disperse the rubbery material as it precipitates out of solution during the prepolymerization step.

After prepolymerizing to the desired conversion level, the mixture is suspended in an aqueous system containing suspension stabilizers and the polymerization is completed to form the ABS product. Peroxide initiators are used in the suspension polymerization step to substantially complete the polymerization. A single initiator can be added to the prepolymerization step as indicated above and a second intiator can be added to the suspension step. However, it is possible to add two initiators to the prepolymerization step, such as a low temperature initiator for prepolymerization and a high temperature initiator for the subsequent suspension step. A suitable initiator which can be used during suspension polymerization is an organic peroxide such as dibenzoyl peroxide, dicaproyl peroxide, dilauroyl peroxide, t-butyl perbenzoate, di-t-butyl peroxide, or mixtures thereof. The suspension polymerization initiator is usually required to shorten the overall time of the polymerization. The amounts of suspension step initiator used are based on the weight of the total prepolymer reaction mixture. They range from about 0.05 to 0.3 weight percent when a particular peroxide is used alone and from about 0.05 to 0.4 weight percent for each of the initiators when a combination of peroxides is used for the polymerization steps. The preferred catalyst levels are from about 0.1 to 0.2 weight percent for a single catalyst and 0.075 to 0.15 weight percent for each when the combination is used. The prepolymer is suspended in an aqueous media containing a suspension stabilizer and the polymerization is continued at a given time-temperature cycle until the remaining monomer in the prepolymer is substantially completely polymerized into uniform sized beads.

Suitable suspension stabilizers include carboxymethyl cellulose, polyvinyl alcohol, methyl cellulose, sulfonated polystyrenes, polyglycol ethers and the like. The preferred suspension stabilizer is a water soluble non-ionic colloid of a high viscosity in an aqueous solution such as hydroxyethyl cellulose. The use of this stabilizer results in non-agglomeration of the polymer beads, minimum water of occlusion of the beads and a narrow size distribution for the beads. Hydroxyethyl cellulose having a viscosity in a 1% aqueous solution at 25° C. of from 750–10,000 cps. (Brookfield viscometer) is adequate. However, a more preferred viscosity range for the 1% aqueous solution is from 1500–3500 cps. (Brookfield viscometer) at 25° C. The preferred hydroxyethyl cellulose is commercially available. Information on properties of hydroxyethyl cellulose can be found in Brownell, H. H. et al. Canadian Journal of Chemistry 35, 677 (1957) and Cohan, S. G. et al. Journal American Chemical Society 73, 3954 (1950).

In preparing the aqueous suspension, the hydroxyethyl cellulose is slowly sifted into the water and rapidly stirred to avoid the formation of agglomerates. If desired, a surface active agent such as sodium dodecylbenzene sulfonate can also be included in the suspension water in an amount of from about 0.001 to 0.01% based on the weight of the water. The amount of hydroxyethyl cellulose used is from about 0.025 to 1.5 weight percent and preferably from about 0.075 to 1.0 weight percent based on the water. Any dissolved oxygen or oxygen in the atmosphere immediately above the suspension is displaced by the use of nitrogen.

The prepolymer is added to the suspension, preferably in the vicinity of the agitator blades so as to facilitate the formation and dispersion of polymer beads. The prepolymer is added in an amount such that the prepolymer to water ratio is from about 1:2 to 5:4, with the best results being obtained with a ratio of 3:4 to 1:1.

The temperature of the suspension is generally increased from, for example, room temperature or higher such as 90° C. up to about 135° C. and can, under suitable conditions, be increased up to 150° C. After a given period non-agglomerated, uniform sized, high impact, thermoplastic polymer beads of uniform color are formed in suspension. The time-temperature cycle best suited for the completion of the polymerization and suspension after the bulk prepolymer has been transferred to the suspension system is generally 4 to 10 hours at temperatures in the range from about 60° to 145° C. Excellent results are obtained, for example, with t-butyl perbenzoate if the suspension is maintained at a temperature of from 100° to 115° C. for 2 to 4 hours, then from 115° to 125° C. for 1 to 2 hours and finally from 125° to 145° C. for 1 to 2 hours.

The substantially completely polymerized beads prepared in accodrance with the above particular embodiment are separated from the suspension water by any of the conventional methods, such as screening, sedimentation or centrifuging and then the beads are washed, dried, extruded, pelletized and packaged.

In a non-preferred embodiment of the present invention, the bulk-suspension polymerization is carried out as indicated above except that the chelating agent is not added until the suspension polymerization step. In this embodiment the propolymer is transferred to the suspension system when the prepolymer mixture contains from about 10 to 50% polymer based on the weight of the polymerizable monomers in the reaction zone. Preferably the prepolymer is transferred when it has reached a stage of about 15 to 30 weight percent polymer. It has been found that some degree of control of the melt flow properties can be achieved if the chelating agent is added to the polymerization system before the initiator is added to the system.

In another embodiment of this invention a modified bulk prepolymerization step can be used in place of the bulk prepolymerization step described above. In this step a suitable diluent is added to the reaction zone along with the monomers. Solution polymerization has many advantages over bulk polymerization. For example, reaction temperatures, heat transfer and reaction rates are easier to control for the solution polymerization over that of bulk polymerization. The particular diluent used depends on the particular monomer to be polymerized. An alkyl aromatic diluent having preferably one alkyl group containing two carbon atoms or more which is liquid at ambient temperatures is a very desirable diluent for the foregoing embodiment. The preferred diluent when the polymerization monomer is styrene, has a boiling point greater than 110° C. and preferably in the range of 130° to 200° C., i.e., diethylbenzene, methylethylbenzene with ethylbenzene being especially preferred. The amount of diluent used in the solution polymerization step can range from 3 to 30% based on the weight of the mixture in the reaction zone. Preferably not less than about 5%, in the case of low rubber content formulations e.g., medium impact polymers and not more than about 25 weight percent in the case of high rubber content formualtions, e.g., high impact ABS polymers. If more than about 30 weight percent diluent is used, there is little additional improvement in the process. Higher concentrations of diluent, i.e., about 30% have been used. However, the capacity of the processing equipment is a factor that must be considered when one goes to higher levels of solvent. The temperatures used during the solution polymerization step usually range from 60° to 180° C. for the reactions contemplated by the foregoing embodiment. Temperatures of at least 60° C. are used in the case of peroxide initiated reactions and at least 100° C. in the case of thermal initiated reactions.

In solution polymerization, one must include the additional step of devolatilization to remove the solvent from the product mixture. For example, the completed polymer-diluent mixture should be transferred to a system comprising a heat exchanger and a devolatilizer where the mixture is heated in either a batch or continuous manner. The volatilizer is operated at temperatures in a range of about 200° to 240° C. and reduced pressures, i.e., about 5 to 360 mm. Hg. These conditions will volatilize the diluent, unreacted monomers and other volatile materials which would be detrimental to the finished product. The vapors are collected in a separate system and can be subsequently separated for further use. The devolatilized polymer can be pumped directly to a die housing or melt fed into an extruder or other apparatus for converting the melt to a suitable form.

A bulk or solution prepolymerization step need not be combined with the suspension step to complete the polymerization. It is possible to achieve the advantages of this invention by carrying out the polymerization with a straight bulk, solution or suspension polymerization or any combination of these techniques. To achieve the best control over the melt flow properties of the polymer product, it is preferred to add the chelating agent to the system before or during the time the mercaptan chain regulator is added to the system.

EXAMPLES

In the illustrative examples presented below, measurements of physical properties of the polymers were made according to standard ASTM procedures or modifications of such where indicated. Izod impact strength in foot pounds per inch notch was determined according to ASTM D–256–56 on injection molded samples using notched bars of ½" x ⅛" x 2½", melt flow in grams per 10 minutes was determined according to ASTM D–1238–62T using a load of 5,000 grams and reported in the tables below as melt index; hardness was determined on a Rockwell Hardness Tester according to ASTM D–785–62, and percent residual styrene monomer was determined by a gas chromatograph. Samples were conditioned according to ASTM D–618–58.

EXAMPLE 1

A round bottom glass reactor, equipped with a condenser, a stirrer and means for adding reactants during the prepolymerization reaction, was charged with styrene, acrylonitrile, a finely ground monomer soluble linear polybutadiene having a cis-1,4-configuration of about 35%, and having a Mooney viscosity number of 35ML$_4$ (100° C.), trisnonylphenyl phosphite as the antioxidant, and a lubricant. The weight of the mixture in the reactor at this point, hereinafter referred to as the original charge, is used as the basis on which the remaining ingredients were added during the prepolymerization reaction. The original charge was agitated until all of the rubber was dissolved and the chelating agent and chain transfer agent were added. The amounts of each of the ingredients charged to the reactor were as follows:

| Ingredients: | Parts by weight |
|---|---|
| Styrene | 66.2 |
| Acrylonitrile | 22.0 |
| Polybutadiene | 10.0 |
| Trisnonylphenyl phosphite | 0.25 |
| Mineral oil | 1.50 |
| 2,6-di-t-butyl-4-methyl phenol | 0.05 |
| Chelating agent: EDTA | 0.1 |
| t-Dodecyl mercaptan | 0.1 |
| Water | [1] >0.3 |

[1] No more than 1% based on the weight of the total reaction mixture was present in the reactor.

The temperature in the reactor was raised from room temperature to 105° C. at about 40 p.s.i.g. and maintained at this temperature until the reactor contained 22 to 24 weight percent solids. An additional 0.15 part of t-dodecyl mercaptan based on the weight of the original charge dissolved in 0.3 part by weight of styrene was then added and the prepolymerization was continued until the reactor contained 32 weight percent solids. The contents were cooled to room temperature and 100 parts by weight of the prepolymer was transferred to a similar reactor containing an equal weight of water, 0.5 part hydroxyethyl cellulose based on the total weight of the prepolymer having a viscosity in a 1% aqueous solution at 25° C. of about 1500 to 2500 cps. (Brookfield Viscometer), 0.15 part by weight of t-butyl perbenzoate and 0.05 part by weight of di-t-butyl peroxide. The polymerization was carried out using the following time-temperature cycle:

| Hours: | ° C. |
|---|---|
| 5 | 105 |
| 1 | 115 |
| 3 | 130 |

After the polymerization was completed, the mixture was cooled, the reactor opened and the contents were removed. The resulting ABS polymer beads were washed with water and dried in a vacuum oven at 65° C. The ABS product had the following physical properties:

| | |
|---|---|
| Izod impact | 1.9 |
| Melt index at 230° C. | 10.5 |
| Rockwell Hardness R Scale | 108 |
| Percent styrene, residual | 0.26 |

Control 1

Example 1 was repeated except that the 0.1 part by weight of EDTA was not added to the reactor. The resulting ABS polymer had the following physical properties:

| | |
|---|---|
| Izod impact | 3.6 |
| Melt index at 230° C. | 2.1 |
| Rockwell Hardness R Scale | 105 |
| Percent styrene, residual | 0.57 |

EXAMPLE 2

Example 1 was repeated except that 0.075 part by weight of EDTA were added to the reactor instead of 0.1 and the following suspension cycle was used:

| Hours: | ° C. |
|---|---|
| 3 | 105 |
| 1 | 115 |
| 1 | 125 |
| 1½ | 145 |

The resulting ABS polymer had the following physical properties:

| | |
|---|---|
| Izod impact | 1.9 |
| Melt index at 230° C. | 10.7 |
| Rockwell Hardness R Scale | 107 |

EXAMPLE 3

Example 1 was repeated except that the addition of the 0.05 part by weight of 2,6-di-t-butyl-4-methyl phenol and the 0.1 part by weight of EDTA were omitted. In their place were added 0.075 part by weight of EDTA-Na$_3$ dissolved in 0.33 part by weight of water. The temperature cycle during the suspension step was also changed to the following:

| Hours: | ° C. |
|---|---|
| 3 | 105 |
| 1 | 115 |
| 1 | 125 |
| 1½ | 145 |

The resulting ABS polymer had the following physical properties:

| | |
|---|---|
| Izod impact | 1.8 |
| Melt index at 230° C. | 10.8 |
| Percent styrene, residual | 0.22 |

The resulting ABS polymer beads had better color, were more uniform and of smaller size than those of Examples 1 and 2. It is believed that the color of products containing acrylonitrile is more stable in alkali media. Therefore properties of the product of Example 3 over the products of Examples 1 and 2 may be due to the fact that the trisodium salt of ethylenediaminetetraacetic acid in solution is alkaline whereas the ethylenediaminetetraacetic acid is acidic. However, it is noted that in Examples 1-3 the products had melt indices of over 10 whereas the products of Control 1 and Control 3 (see below), under identical process conditions but without the chelating agent, had a melt index of only about 2.

Control 3

Example 3 was repeated except that the 0.075 part of EDTA-$Na_3$ in water were not added to the reactor. The physical properties of the resulting ABS polymer were as follows:

Izod impact _____ 4.4
Melt index at 230° C. _____ 2.0

EXAMPLE 4

The prepolymerization step of Example 1 was repeated except that 0.1 part by weight citric acid was used in place of the 0.1 part by weight of EDTA. The cycle during the suspension step was the same as that of Example 2. The physical properties of the resulting ABS polymer were as follows:

Izod impact _____ 1.8
Melt index at 230° C. _____ 9.4

EXAMPLE 5

Example 1 was repeated except that 0.2 part by weight of citric acid were used in place of the 0.1 part by weight of EDTA. The melt indices at 230° C. of duplicate ABS samples were 9.4 and 9.8.

EXAMPLE 6

Example 1 was repeated except that 0.2 part of tartaric acid were added in place of the 0.1 part by weight of EDTA during the prepolymerization step and 0.1 part of t-butyl perbenzoate was added in place 0.15 part by weight during the suspension step. The resulting ABS polymer had the following physical properties:

Izod impact _____ 1.4
Melt index at 230° C. _____ 11.2
Rockwell Hardness R Scale _____ 109

EXAMPLE 7

Control 3 was repeated except that 0.075 part by weight of EDTA was added during the suspension step. The resulting ABS polymer product had the following physical properties:

Izod impact _____ 2.0
Melt index at 230° C. _____ 9.4

EXAMPLE 8

Example 7 was repeated except 0.075 part by weight of EDTA-$Na_3$ were added in place of EDTA during the suspension step. The physical properties of the resulting ABS polymer were:

Izod impact _____ 1.8
Melt index at 230° C. _____ 9.0

The color of the product like that of Example 2 was better than that of the products obtained when using the acidic chelating agents. However, as indicated by the foregoing examples, the melt indices of the resulting products were all 9 and above compared to about 2 for the control products.

EXAMPLE 9

In this example a rubber-modified polystyrene was prepared with the same procedure used in Example 1 except that the acrylonitrile was not added to the reactor. The amounts charged to the reactor as in Example 1 were as follows:

| Ingredients: | Parts by weight |
|---|---|
| Styrene | 88.8 |
| Polybutadiene | 10.0 |
| Trisnonylphenyl phosphite | 0.2 |
| Mineral oil | 1.0 |
| EDTA-$Na_3$ | 0.075 |
| Water | 0.33 |
| t-Dodecyl mercaptan | 0.06 |

The temperature of the reactor was raised from room temperature of 115° C. and maintained at this temperature until the reactor contained 24% total solids. An additional 0.1 part by weight of t-dodecyl mercaptan dissolved in styrene was then added and the prepolymerization was continued until the reactor contained 35 weight percent total solids. The contents in the reactor were cooled to room temperature and suspended in an equal weight of water containing 0.312 part by weight of hydroxyethyl cellulose and 0.13 part by weight of t-butyl perbenzoate. The time-temperature cycle for this suspension step was 6 hours at 115° C. and 2 hours at 135° C. The resulting rubber-modified polystyrene had the following physical properties:

Izod impact _____ 1.7
Melt index at 190° C. _____ 3.4
Percent styrene, residual _____ 0.16

Control 9

Example 9 was repeated except that EDTA-$Na_3$ was not added to the reactor. The resulting rubber-modified polystyrene polymer had the following properties:

Izod impact _____ 2.7
Melt index at 190° C. _____ 1.0
Percent styrene, residual _____ 0.35

EXAMPLE 10

This example when compared with Control 10 shows the effective control one has over the entire melt flow property range of the ABS polymers prepared in accordance with the present invention. The following procedure was used for each of the batches of Examples 10, 11 and 12:

Ground polybutadiene rubber of the same type used in the above examples was dissolved in a monomeric solution containing acrylonitrile and styrene in the ratio of 1:3, trisnonylphenyl phosphite, white mineral oil and 2,6-di-t-butyl-4-methyl phenol at about 49° to 65° C. with agitation in a dissolver. This original charge was transferred to a prepolymerizer and the chelating agent, water and mercaptans were added. The temperature of the mixture in the prepolymerizer was raised to about 105° C. and maintained at this temperature until the prepolymer contained about 22–24 weight percent total solids and a second addition of mercaptans was made. The prepolymerization continued until the prepolymer contained between 26 and 34 weight percent total solids. The prepolymer mixture was transferred to a suspension reactor containing the same suspension system used in the above examples. The mixture was polymerized at one of the following time-temperature cycles:

| Cycle 1, hrs.: | ° C. |
|---|---|
| 5 | 100 |
| 2 | 105 |
| 1 | 115 |
| 0.5 | 130 |
| 1 | 145 |
| Cycle 2, hrs.: | |
| 5 | 100 |
| 2 | 105 |
| 1 | 115 |
| 3 | 130 |

Cycle 3, hrs.:
  4 ------------------------------------- 105
  1 ------------------------------------- 115
  1 ------------------------------------- 130
Cycle 4, hrs.:
  6 ------------------------------------- 100
  2 ------------------------------------- 105
  1 ------------------------------------- 115
  3 ------------------------------------- 130
Cycle 5, hrs.:
  4 ------------------------------------- 105
  1 ------------------------------------- 115
  3 ------------------------------------- 130
Cycle 6, hrs.:
  4 ------------------------------------- 105
  2 ------------------------------------- 115
  2 ------------------------------------- 130
Cycle 7, hrs.:
  4 ------------------------------------- 105
  1 ------------------------------------- 115
  2 ------------------------------------- 130

In each case it takes a half-hour to raise the temperature from one temperature plateau to another.

In Tables I, II, III and IV which follow, the amounts added during the prepolymerization step were all in parts by weight based on the 100 parts of the original charge to the prepolymerizer and the amounts added during the suspension step were parts by weight based on the 100 parts of prepolymer added to the suspension reactor.

Other details of the polymerization including the formulations used and the physical properties of the resulting ABS polymers are set forth in the Table I below.

TABLE I

| | Example 10 | | | |
|---|---|---|---|---|
| | A | B | C | D |
| Prepolymerization step: | | | | |
| Styrene | 63 | 66.2 | 66.2 | 64.4 |
| Acrylonitrile | 22.2 | 22.0 | 22.0 | 21.6 |
| Polybutadiene | 12.0 | 10.0 | 10.0 | 12.0 |
| Trisnonyl phenyl phosphite | 0.25 | 0.25 | 0.25 | 0.25 |
| Mineral oil | 2.5 | 1.5 | 1.5 | 1.5 |
| 2,6-di-t-butyl-4-methylphenol | 0.05 | 0.05 | 0.05 | 0.05 |
| Chelating agent: EDTA | 0.075 | 0.075 | 0.075 | 0.075 |
| Water added to system | 0.3 | 0.3 | 0.3 | *None |
| First addition: t-dodecyl mercaptan | 0.1 | 0.1 | 0.07 | 0.05 |
| Second addition: | | | | |
|   t-Dodecyl mercaptan | | 0.04 | 0.18 | 0.20 |
|   n-Dodecyl mercaptan | | | 0.02 | 0.075 |
| Total solids at transfer, percent | 30-32 | 26-28 | 30-32 | 32-34 |
| Suspension step: | | | | |
| Initiator: | | | | |
|   t-Butyl perbenzoate | 0.15 | 0.15 | 0.15 | 0.15 |
|   Di-t-butyl peroxide | 0.025 | 0.025 | 0.025 | 0.05 |
| Cycle | 3 | 3 | 3 | 4 |
| Prepolymer | 100 | 100 | 100 | 100 |
| Water | 118 | 118 | 118 | 118 |
| Hydroxyethyl cellulose | 0.77 | 0.77 | 0.77 | 0.83 |
| Physical properties: | | | | |
| Izod impact | 9.9 | 7.6 | 5.1 | 1.8 |
| Melt index at 230° C | 0.4 | 1.9 | 8.2 | 12.5 |
| Rockwell hardness R scale | 73 | 104 | 105 | 86.9 |

* Greater than about 0.3 part by weight water present in prepolymerizer.

Control 10

Example 10 was repeated except that the chelating agent and water were not present in the prepolymerizer. Table II below sets forth the formulations, process conditions and physical properties of the resulting ABS polymers for each of the batches for Control 10:

TABLE II

| | Control 10 | | | |
|---|---|---|---|---|
| | A | B | C | D |
| Prepolymerization step: | | | | |
| Styrene | 66.2 | 66.1 | 66.1 | 66.1 |
| Acrylonitrile | 22.0 | 22.0 | 22.0 | 22.1 |
| Polybutadiene | 10.0 | 10.0 | 10.0 | 10.0 |
| Trisnonyl phenyl phosphite | 0.25 | 0.25 | 0.25 | 0.25 |
| Mineral oil | 1.5 | 1.5 | 1.5 | 1.5 |
| 2,6-di-t-butyl-4-methyl phenol | 0.05 | | | 0.05 |
| Chelating agent: EDTA | None | None | None | None |
| Water added to system | None | None | None | None |
| First addition: t-dodecyl mercaptan | 0.1 | 0.1 | 0.1 | 0.2 |
| Second addition: | | | | |
|   t-Dodecyl mercaptan | 0.15 | 0.15 | 0.15 | 0.2 |
|   n-Dodecyl mercaptan | | 0.1 | 0.15 | 0.2 |
| Total solids at transfer, percent | 30-32 | 32 | 34 | 30-32 |
| Suspension step: | | | | |
| Initiator: | | | | |
|   t-Butyl perbenzoate | 0.15 | 0.12 | 0.12 | 0.15 |
|   Di-t-butyl peroxide | 0.05 | 0.05 | 0.05 | 0.05 |
| Cycle | 2 | 1 | 1 | 2 |
| Prepolymer | 100 | 100 | 100 | 100 |
| Water | 118 | 118 | 118 | 118 |
| Hydroxyethyl cellulose | 0.83 | 0.885 | 0.885 | 0.83 |
| Physical properties: | | | | |
| Izod impact | 5.7 | 5.3 | 5.9 | 5.6 |
| Melt index flow at 230° C | 0.84 | 0.41 | 0.38 | 0.85 |
| Rockwell hardness R scale | 104.4 | 106.6 | 92.0 | 100.9 |

The results summarized in Table I compared with those summarized in Table II indicate that, with proper control of the levels of the mercaptan chain modifier, the product melt flow can be varied over extremely wide limits by means of the process of this invention. As shown in Table I, the melt index of the various batches ranged from 0.4 to 12.5 as the total amount of mercaptan was increased from 0.1 to 0.325 part by weight. In each case the amount of chelating agent and water remained substantially constant. The process conditions of each of the batches were only slightly different and made no significant difference in the control of melt flow. As shown in Table II, 0.85 was the highest melt index of the control products that was obtained even though the total amount of the mercaptan levels was increased from 0.25 to 0.6 part by weight. The combination of a chelating agent and mercaptans in the presence of water permits one to have control over the complete range of melt flow properties of the polymer while maintaining high impact strength and hardness.

If a very high impact strength ABS polymer is desired in the low to medium melt index range (e.g., for extrusion applications), a relative low concentration of mercaptan should be used with the chelating agent; see batches A and B of Example 10. On the other hand, if a medium to high impact strength ABS is desired in the high melt index range (e.g., for molding applications), a relatively high concentration of mercaptan should be used with the chelating agent; see batches C and D of Example 10.

EXAMPLE 11

This example when compared with Control 11 shows the criticality of the presence of water to the process of this invention. The procedure for this example was the same as that for Example 10. The formulations, process conditions and melt indices of the resulting ABS polymers for each of the batches of Example 11 are set forth in Table III below.

Control 11

Example 11 was repeated except that the amount of water was varied from 0 to 0.15 part by weight. Table III below summarizes the conditions and results:

Table IV indicates that concentrations of EDTA greater than 0.025 part by weight or greater than about 0.025% based on the total weight of the mixture in the prepolymerizer must be added to the reactor to achieve the desired

TABLE III

|  | Example 11 ||| Control 11 |||
|---|---|---|---|---|---|---|
|  | E | F | G | E | F | G |
| Prepolymerization step: | | | | | | |
| Styrene | 66.2 | 65.3 | 59.6 | 66.2 | 65.2 | 59.6 |
| Acrylonitrile | 22.0 | 22.9 | 25.6 | 22.0 | 22.9 | 25.6 |
| Polybutadiene | 10.0 | 10.0 | 12.0 | 10.0 | 10.1 | 12.0 |
| Trisnonyl phenyl phosphite | 0.25 | 0.25 | 0.25 | 0.25 | 0.25 | 0.25 |
| Mineral oil | 1.5 | 1.5 | 2.5 | 1.5 | 1.5 | 2.5 |
| 2,6-di-t-butyl-4-methyl phenol | 0.05 | 0.05 | 0.05 | 0.05 | 0.05 | 0.05 |
| Chelating agent: EDTA | 0.1 | 0.075 | 0.1 | 0.1 | 0.075 | 0.1 |
| Water added to system | 0.3 | 0.3 | 0.3 | 0.15 | None | None |
| First addition: t-dodecylmercaptan | 0.1 | 0.1 | 0.07 | 0.1 | 0.1 | 0.07 |
| Second addition: | | | | | | |
| t-Dodecyl mercaptan | 0.05 | 0.07 | 0.18 | 0.05 | 0.07 | 0.18 |
| n-Dodecyl mercaptan | | | 0.1 | | | 0.1 |
| Total solids at transfer, percent | 32 | 30–32 | 32 | 32 | 32 | 30–32 |
| Suspension step: | | | | | | |
| Initiator: | | | | | | |
| t-Butyl perbenzoate | 0.15 | 0.15 | 0.15 | 0.15 | 0.15 | 0.15 |
| Di-t-butyl peroxide | 0.025 | 0.05 | 0.025 | 0.05 | 0.05 | 0.05 |
| Cycle | 3 | 3 | 3 | 3 | 3 | 3 |
| Prepolymer | 100 | 100 | 100 | 100 | 100 | 100 |
| Water | 118 | 118 | 118 | 118 | 118 | 118 |
| Hydroxyethyl cellulose | 0.77 | 0.77 | 0.77 | 0.77 | 0.77 | 0.77 |
| Physical property: melt index at 230° C | 1.6 | 2.6 | 6.4 | 0.14 | 0.1 | 0.14 |

A comparison of the melt indices of batches E, F and G of Example 12 as shown in Table III with the corresponding melt indices of the controls shows that water in amounts greater than 0.15 part by weight, or greater than about 0.15% on the total weight of the mixture in the prepolymerizer must be present with the chelating agent to give the desired degree of melt flow control.

EXAMPLE 12

This example when compared with Control 12 illustrates the effect the chelating agent concentration has on the melt flow and other properties of the ABS polymers. The same general procedure was used in this example that was used in Example 10 except that the amount of EDTA was varied from 0.075 to 0.2 part by weight. Table IV below sets forth the formulations, process conditions and physical properties of the resulting ABS polymers.

Control 12

Example 12 was repeated except that the amount of EDTA was varied from 0 to 0.025 part by weight. Table IV below summarizes the conditions and results:

melt flow control. The results show that at least about 0.075% EDTA was required to obtain maximum utilization of the mercaptan for chain transfer. Table IV also shows that EDTA in concentrations of 0.2% resulted in no further increase in melt flow than with 0.1%, compare batch I with batch J. This indicates that the chelating agent is not acting as a chain transfer agent.

EXAMPLE 13

This example when compared with Control 13 illustrates that the desired control over the melt flow properties of the resulting polymer is not obtained unless the chelating agent contains at least one free acid group per molecule. The same procedure was used for this example that was used for Example 1. Table V below set forth the formulations, process conditions and physical properties of the resulting ABS polymers.

Control 13

Example 13 was repeated except that 0.1 weight percent of the calcium disodium salt of EDTA was substituted for 0.075 weight percent of EDTA

TABLE IV

|  | Example 12 ||| Control 12 |||
|---|---|---|---|---|---|---|
|  | H | I | J | H | I | J |
| Prepolymerization step: | | | | | | |
| Styrene | 63.7 | 66.2 | 63.9 | 64.6 | 63.0 | 63.0 |
| Acrylonitrile | 22.4 | 20.9 | 22.1 | 22.0 | 22.2 | 22.2 |
| Polybutadiene | 12.0 | 10.0 | 12.0 | 12.0 | 12.0 | 12.0 |
| Trisnonyl phenyl phosphite | 0.25 | 0.25 | 0.25 | 0.25 | 0.25 | 0.25 |
| Mineral oil | 2.5 | 2.5 | 2.5 | 1.5 | 2.5 | 2.5 |
| 2,6-di-t-butyl-4-methyl-phenol | 0.05 | 0.05 | 0.05 | 0.05 | 0.05 | 0.05 |
| Chelating agent: EDTA | 0.075 | 0.1 | 0.2 | 0.025 | None | 0.025 |
| Water added to system | *None | *None | *None | *None | *None | *None |
| First addition: t-dodecyl mercaptan | 0.07 | 0.1 | 0.1 | 0.07 | 0.1 | 0.1 |
| Second addition: | | | | | | |
| t-Dodecyl mercaptan | 0.18 | 0.1 | 0.1 | 0.18 | 0.1 | 0.1 |
| n-Dodecyl mercaptan | | | | | | |
| Total solids at transfer, percent | 33 | 34 | 34 | 33 | 34 | 32 |
| Suspension step: | | | | | | |
| Initiator: | | | | | | |
| t-Butyl perbenzoate | 0.15 | 0.15 | 0.15 | 0.15 | 0.15 | 0.15 |
| Di-t-butyl peroxide | 0.05 | 0.05 | 0.05 | 0.05 | 0.05 | 0.05 |
| Cycle | 7 | 6 | 5 | 5 | 5 | 5 |
| Prepolymer | 100 | 100 | 100 | 100 | 100 | 100 |
| Water | 118 | 118 | 118 | 118 | 118 | 118 |
| Hydroxyethyl cellulose | 0.77 | 0.77 | 0.77 | 0.77 | 0.77 | 0.77 |
| Physical properties: | | | | | | |
| Izod impact | 6.4 | 5.9 | 6.4 | 7.8 | 8.9 | 8.4 |
| Melt index at 230° C | 4.4 | 3.5 | 3.5 | 2.2 | 2.6 | 2.4 |
| Rockwell hardness R scale | 106 | 103 | 99 | 101 | 98 | 95 |

*Greater than about 0.3 part by weight water present in prepolymerizer.

TABLE V

|  | Example 13 | Control 13 |
|---|---|---|
| Prepolymerization step: |  |  |
| Styrene | 66.2 | 66.2 |
| Acrylonitrile | 22.0 | 22.0 |
| Polybutadiene | 10.0 | 10.0 |
| Trisnonylphenyl phosphite | 0.25 | 0.25 |
| Mineral oil | 1.5 | 1.5 |
| 2,6-di-t-butyl-4 methyl phenol | 0.05 | 0.05 |
| Chelating agent: |  |  |
| EDTA | 0.075 |  |
| Calcium disodium salt of EDTA |  | 0.1 |
| Water present in system | >0.3 | >0.3 |
| First addition: t-dodecyl mercaptan | 0.1 | 0.1 |
| Second addition: t-dodecyl mercaptan | 0.15 | 0.15 |
| Total solids at transfer, percent | 32 | 32 |
| Suspension step: |  |  |
| Initiator: |  |  |
| t-Butyl perbenzoate | 0.15 | 0.15 |
| t-Butyl peroxide | 0.05 | 0.05 |
| Cycle | *8 | *8 |
| Prepolymer | 100 | 100 |
| Water | 100 | 100 |
| Hydroxyethyl cellulose | 0.5 | 0.5 |
| Physical properties: |  |  |
| Izod impact | 1.9 | 2.3 |
| Melt index at 230° C | 10.7 | 5.6 |
| Rockwell hardness R scale | 107 | 015 |
| Percent styrene, residual |  | 0.22 |

*Cycle 8:

| Hours: | ° C. |
|---|---|
| 3 | 105 |
| 1 | 115 |
| 1 | 125 |
| 1½ | 145 |

Table V indicates that the desired control over the melt index of the ABS polymer was not obtained when a chelating agent containing no free acid groups per molecule (Control 13) was used in place of EDTA having at least one free acid group per molecule (Example 13) for exactly the same level of mercaptan addition.

Obviously, other modifications can be made to the process of this invention than those illustrated by the enumerated examples without departing from the spirit of the invention. All such modifications that fall within the scope of the appended claims are intended to be embraced thereby.

What is claimed is:

1. A process for converting styrene and polybutadiene to form a rubber-modified polymer which comprises the following steps:

(a) contacting in a bulk prepolymerization zone a solution of from about 2 to 30% by weight based on the weight of the total mixture in said bulk prepolymerization zone of said polybutadiene dissolved in said styrene with at least 0.025% up to about 5% by weight based on the weight of said mixture prior to bulk prepolymerization of an agent selected from the group consisting of ethylenediaminetetraacetic acid, methylene disalicyclic acid, salicylic acid, citric acid, tartaric acid, ascorbic acid, phosphoric acid and partial salts thereof containing at least one free carboxylic acid group per molecule and from about 0.01% up to a maximum of 2.0% by weight based on the weight of said mixture of a mercaptan chain regulator in the presence of a small amount of water in an amount of at least 0.3% up to about 5% by weight based on the weight of said mixture, (b) partially polymerizing said mixture in said bulk prepolymerization zone at a temperature in the range of about 60° to 120° C. until from about 15 to 50% of the monomer is polymerized in said mixture, (c) suspending the partially polymerized mixture obtained from step (b) in an aqueous system in a suspension polymerization zone, (d) substantially completely polymerizing said partially polymerized mixture in said suspension polymerization zone at a temperature in the range of about 60° to 145° C., and (e) recovering a rubber-modified polymer having a substantially higher melt flow than rubber-modified polymers prepared under the same process conditions but without the use of said agent and said water.

2. The process of claim 1 wherein acrylonitrile in amounts up to 40 percent based on the weight of said mixture is present with the styrene and polybutadiene in said prepolymerization zone.

3. The process of claim 1 wherein said polybutadiene is a linear polybutadiene having a cis content of about 30 to 98 percent by weight.

References Cited

UNITED STATES PATENTS

| 3,288,887 | 11/1966 | Yoshino et al. | 260—880 |
| 3,439,065 | 4/1969 | Luftglass | 260—880 |
| 3,428,712 | 2/1969 | Carrock et al. | 260—880 |

FOREIGN PATENTS

| 873,948 | 8/1961 | Great Britain | 260—880 |

JAMES A. SEIDLECK, Primary Examiner

U.S. Cl. X.R.

260—93.5 S, 878 R